United States Patent
Kanza et al.

(10) Patent No.: US 11,088,827 B2
(45) Date of Patent: Aug. 10, 2021

(54) LOCATION-BASED BLOCKCHAIN

(71) Applicant: AT&T Intellectual Property I, L.P., Atlanta, GA (US)

(72) Inventors: Yaron Kanza, Fair Lawn, NJ (US); Divesh Srivastava, Summit, NJ (US); Tamraparni Dasu, New Vernon, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 234 days.

(21) Appl. No.: 16/029,848

(22) Filed: Jul. 9, 2018

(65) Prior Publication Data
US 2020/0014529 A1  Jan. 9, 2020

(51) Int. Cl.
| | |
|---|---|
| *H04L 9/30* | (2006.01) |
| *H04L 9/32* | (2006.01) |
| *G06Q 20/06* | (2012.01) |
| *G06Q 20/38* | (2012.01) |
| *H04L 9/06* | (2006.01) |
| *G06Q 20/36* | (2012.01) |

(52) U.S. Cl.
CPC ........... *H04L 9/0637* (2013.01); *G06Q 20/06* (2013.01); *G06Q 20/36* (2013.01); *G06Q 20/3829* (2013.01); *H04L 9/30* (2013.01); *H04L 9/3268* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 9,870,591 B2 | 1/2018 | Shah | |
| 2012/0284155 A1* | 11/2012 | Holten | G06Q 40/00 705/35 |
| 2013/0326224 A1* | 12/2013 | Yavuz | H04L 9/3247 713/176 |
| 2017/0041148 A1 | 2/2017 | Pearce | |

(Continued)

OTHER PUBLICATIONS

Karame et al., Double-Spending Fast Payments in Bitcoin, (2012), CCS'12, Oct. 16+18, 2012, Raleigh, No. USA, pp. 906-917. (Year: 2012).*

(Continued)

*Primary Examiner* — Luu T Pham
*Assistant Examiner* — Edward X Long
(74) *Attorney, Agent, or Firm* — Hartman & Citrin LLC

(57) ABSTRACT

Concepts and technologies disclosed herein are directed to location-based blockchain. A localized corroborator system can receive, from a user device, an initiation message including a public key, and in response, can generate and send the random session identifier to the user device. The system can receive, from the user device, a signed session identifier including the random session identifier signed by the user device using a private key. The system can check a time that elapsed between sending the random session identifier to the user device and receiving the signed session identifier from the user device. The system can verify authenticity of the signed session identifier using the public key. In response to the time being less than a pre-defined threshold, the system can issue a location certificate to the user device. The user device can utilize the location certificate to conduct a certified blockchain transaction in a blockchain.

11 Claims, 8 Drawing Sheets

(56) References Cited

U.S. PATENT DOCUMENTS

| | | | |
|---|---|---|---|
| 2017/0085555 A1 | 3/2017 | Bisikalo et al. | |
| 2017/0127373 A1* | 5/2017 | Deshpande | H04W 12/0609 |
| 2017/0236094 A1 | 8/2017 | Shah | |
| 2017/0249712 A1 | 8/2017 | Branscomb et al. | |
| 2017/0278186 A1 | 9/2017 | Creighton, IV et al. | |
| 2018/0019867 A1 | 1/2018 | Davis | |
| 2018/0020324 A1 | 1/2018 | Beauford | |
| 2018/0048461 A1 | 2/2018 | Jutla et al. | |
| 2018/0062831 A1 | 3/2018 | Zhang | |
| 2018/0082291 A1* | 3/2018 | Allen | H04L 9/3263 |
| 2018/0082296 A1 | 3/2018 | Brashers | |

OTHER PUBLICATIONS

Yuan et al., Blockchain and Cryptocurrencies: Model, Techniques, and Applications, (2018), IEEE Transactions on Systems, Man, and Cybernetics: Systems, vol. 48, No. 9, Sep. 2018, pp. 1421-1428. (Year: 2018).*

King, Ryan, "Crypto-spatial Coordinates, Proof of Location & Spatial index," FOAM, blog.foam.space, Dec. 8, 2017.

* cited by examiner

LOCATION-BASED BLOCKCHAIN

BACKGROUND

Blockchain is emerging as a preeminent decentralized ledger and is receiving increasing attention from researchers, practitioners, organizations, and the public. Initially, blockchain was developed to address the "double spending" problem in cryptocurrencies, but recently, many new applications of blockchain have been proposed or are being developed. Blockchain allows sharing data in a decentralized, transparent and immutable way, using a peer-to-peer network, without the need to trust any particular entity. To achieve this in a public blockchain, where the peers are a priori unknown, efficiency and scalability are often sacrificed.

Recently, cryptocurrencies have flourished, and in particular, the importance of Bitcoin has increased, as it becomes an acceptable method of payment to a growing number of organizations and companies. Cryptocurrencies facilitate micropayments, provide anonymity to both the payer and the payee, and provide the basis for an economy without regulation. This challenges the traditional economic order.

Blockchain is receiving growing attention not just as the underlying technology of cryptocurrencies, but also as a public ledger in various domains. Financial institutions, for example, are examining the use of blockchain as a ledger for financial transactions to cut out the middleman to reduce costs and to expedite processing transactions. Blockchain also can be used to maintain digital assets, such as stocks, bonds, land titles, and the like. Stored transactions record the transfer of assets between users. Blockchain can store data and documents, either in full or merely as a digest of the data (e.g., a cryptographic hash like SHA-256) to provide evidence of the existence of data or documents, such as contracts, patents, scientific publications, deeds, insurance policies, and the like. Blockchain also can be used for identity management through hashed features of a person (e.g., verifiable attributes of the person) stored with a public key or some other means to electronically sign documents, or access remote services to protect people from identity theft and fraudulent impersonation. Blockchain has the potential to provide a secure infrastructure for smart cities and could facilitate the creation of a marketplace of social data where people share their private data for public benefit. Blockchain also has commercial uses, such as for tracking diamonds from mines to market, managing data provenance in Internet of Things ("IoT") systems, providing transparency in product manufacturing and supply chain management, and supporting vehicle provenance.

While the importance of blockchains is growing rapidly, it still has drawbacks and limitations that raise concerns regarding its scalability and suitability to large-scale applications. A notable concern is that the creation and maintenance of a public blockchain causes a significant waste of energy due to excessive work by the involved peers. Leading blockchains, such as Bitcoin, are based on proof-of-work where the peers, called miners, need to execute a demanding computation to create a block. It is estimated that the energy consumption of maintaining Bitcoin exceeds the energy consumption of Ireland. The energy consumption continues to grow as more miners join the network.

Another concern with blockchain is the low rate of transactions. In Bitcoin, for example, a block is created approximately every 10 minutes, and the size of a block is fixed (1 MB in Bitcoin, 2 MB in SegWit2x, and 8 MB in Bitcoin Cash), and the rate of adding transactions to the blockchain is around 7 transactions per second. Such a limitation exists in other blockchains as well; for example, it is estimated that in Ethereum the transaction rate is about 10-30 transactions per second. This is several orders of magnitude smaller than the transaction rate that modern financial institutions are able to process (e.g., more than 30,000 transactions per second in the VISA network). Changing the block creation rate or the size of a block is difficult because a blockchain is decentralized, without any entity that can force a change or enforce new rules. In addition, rapid block creation may result in frequent forks, which would make the blockchain less stable and more vulnerable to attacks.

Anonymity in cryptocurrencies like Bitcoin provides some advantages but also creates risks. A money transfer from an owner of coins to a payee requires merely a signature using the private key of the payer. If the private key of a coin owner is revealed or stolen, their coin(s) can be stolen. A lost private key is like lost money. Thus, cryptocurrencies are susceptible to theft and money loss.

SUMMARY

Concepts and technologies disclosed herein are directed to location-based blockchain. According to one aspect of the concepts and technologies disclosed herein, a localized corroborator system can receive, from a user device, an initiation message including a public key. In response to receiving the initiation message, the localized corroborator system can generate and send a random session identifier to the user device. The localized corroborator system can receive, from the user device, a signed session identifier including the random session identifier signed by the user device using a user private key associated with the user device. The localized corroborator system can check a time that elapsed between sending the random session identifier to the user device and receiving the signed session identifier from the user device. The localized corroborator system can verify authenticity of the signed session identifier using the public key. In response to the time being less than a pre-defined threshold, the localized corroborator system can issue a location certificate to the user device, wherein the user device utilizes the location certificate to conduct a certified blockchain transaction in a blockchain.

In some embodiments, the location certificate can identify a location associated with the localized corroborator system. In some embodiments, the localized corroborator system can include a cellular base station that serves the location. In some embodiments, the location can include a sub-area of a set of sub-areas of a geographical area. The set of sub-areas represents a hierarchy. The blockchain can include a plurality of sub-chains each associated with one sub-area of the set of sub-areas.

In some embodiments, the certified blockchain transaction of the blockchain includes a transfer of an asset from a first wallet associated with the user device to a second wallet associated with a second user device. The asset, in some embodiments, can include a cryptocurrency in the form of coins. The asset alternatively can include an asset associated with a real estate transaction, a supply chain, or data management in a smart city context. The assets can include other digital or virtual assets, including, for example, tickets (e.g., flight, concert, amusement park, etc.), digital art assets, specific rights (e.g., voting rights, property rights such as deeds, etc.), and investments (e.g., bonds, stocks, and other investment vehicles. In some embodiments, the transfer can include a lateral transfer within a particular sub-area of the set of sub-areas. In some embodiments, the transfer can include an ascending transfer from a particular sub-area of the set of sub-areas to a parent sub-area of the particular sub-area of the set of sub-areas. In some embodiments, the transfer can include a descending transfer from a particular sub-area of the set of sub-areas to a child sub-area of the particular sub-area of the set of sub-areas. In some embodiments, the certified blockchain transaction can include a plurality of transfers of the asset.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
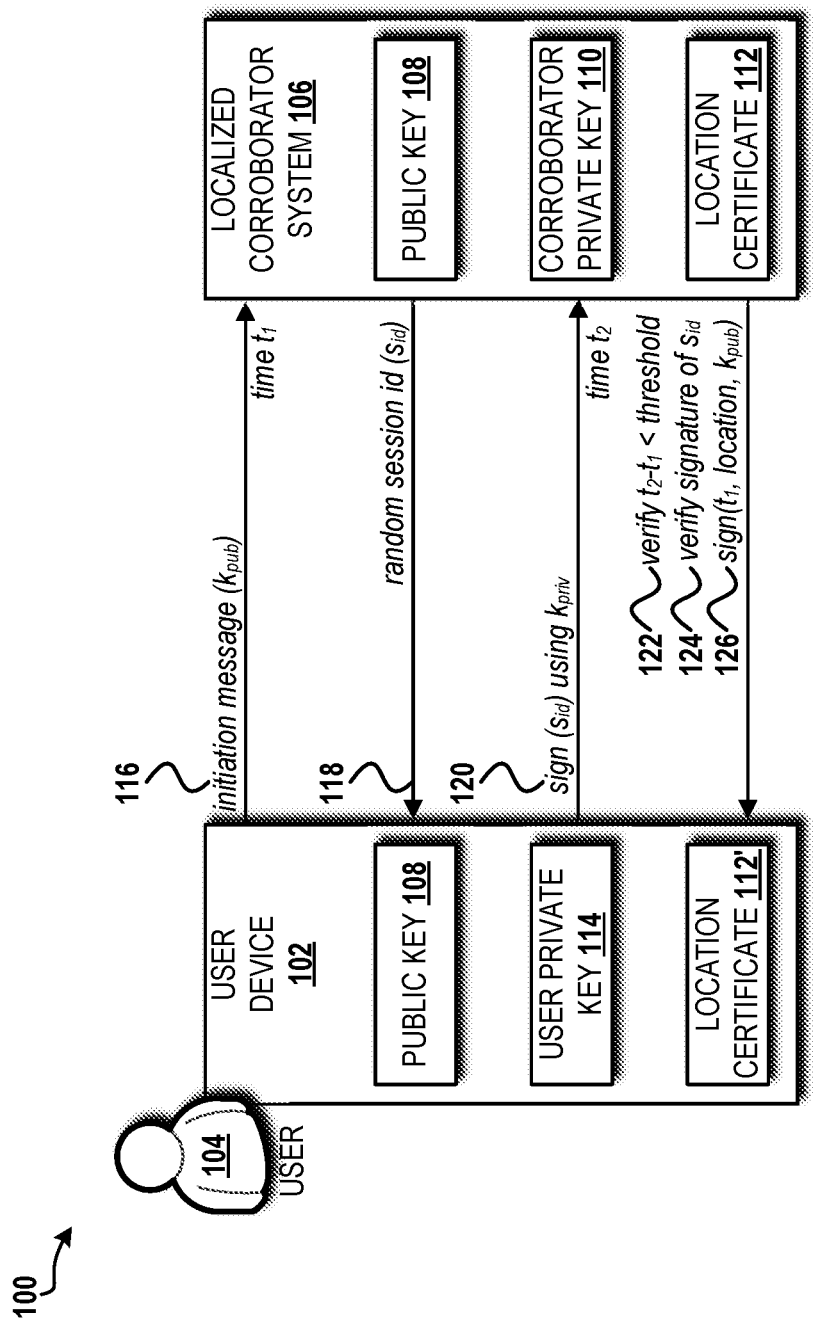
FIG. 1 is a block diagram illustrating an illustrative operating environment capable of implementing aspects of the concepts and technologies disclosed herein.

Blockchain is a decentralized ledger that stores transactions in a chain of blocks. In cryptocurrencies, a transaction can be a reward to the creator of a block, or a transfer of coins from the owner to a payee. Each transaction includes the public key of the payee. Transactions form a chain of coin transfers. To transfer money, the owner of the coins signs the transfer using the private key that matches the public key in the transaction that granted her/him the coins. Given coins and the transaction that granted the coins, only someone who possesses the private key that matches the public key in the transaction can spend the coins—that is, transfer the coins to another entity. In many blockchains, user identities are not revealed for anonymity such that money transfer is between wallets, where a user may have multiple wallets. In Bitcoin, the term "address" is used for the public key and serves as the pseudonym of the user. Moreover, a "wallet" is the software that manages addresses. The term "address" is not used herein because it could be ambiguous in the context of geospatial data. However, some current systems and future systems might replace the term "wallet" with a different name, such as "address." Those skilled in the art will appreciate the applicability of various terms that fundamentally refer to the same concept of a "wallet" as used herein.

A transaction t that transfers m coins from wallet x to wallet y can be denoted as $t=(x \rightarrow y, m)$. A transaction t that grants m coins to wallet y as a reward can be denoted as $t=(x \rightarrow y, m)$. To prevent double spending, the transactions are added to the blockchain and are made public. The blockchain defines a serialization of the transactions, so that if two transactions transfer the same coins (i.e., double spending), after the insertion of one of the transactions into the blockchain, the other transaction is considered invalid, and should not be added to the blockchain. The blockchain, thus, represents a consensus of the peers on which transactions are valid.

The transactions are organized into blocks, which are created and added to the blockchain by members of a peer-to-peer network. In Bitcoin, these peers are called "miners." The first block in the chain is the genesis block. Every other block contains a hash of the previous block in the chain (e.g., using SHA-256). This means that a change in one of the blocks would either result in an incorrect chain or would require changing the hash values in all the following blocks. A blockchain is maintained in a decentralized manner. A blockchain is immutable, where changes of past blocks are practically impossible. To achieve this and to prevent forks, where a separation of the chain cannot be resolved, blockchains like Bitcoin rely on proof-of-work. Proof-of-work is a computation that is hard and time consuming (e.g., a cryptographic riddle). In Bitcoin, each block includes a nonce such that the hash of the block (with the nonce) has at least k leading zeros. Computing the nonce is hard, and thus is a proof-of-work. The value k is determined such that the overall computation by all the peers (i.e., miners) would require approximately 10 minutes for computing a block. In case of a conflict, or a fork, miners are expected to add blocks to the longest branch. This causes short branches to be abandoned and prevents forks. A block that contains invalid transactions (e.g., double spending), will be ignored by the majority of the peers, and eventually will not be part of the chain.

An attacker that tries to change a block in the blockchain needs to create an alternative branch and compete with all the other miners in an attempt to make the alternative branch the longest one. The chances of succeeding are slim due to the hardness of block creation. This provides immutability, stability and reliability.

The concepts and technologies disclosed herein describe partitioning of a blockchain into a hierarchy of sub-chains, reflecting a real-world sub-division, to increase scalability and security of the blockchain. The concepts and technologies disclosed herein also illustrate a geospatial partitioning and explain how localization and location certificates can be used to reliably establish association among sub-chains. The levels of the hierarchy provide a tradeoff between privacy and confirmation time of transactions. To prevent inflated energy consumption when replacing a single blockchain by many sub-chains, a novel proof-of-location approach is disclosed herein. Proof-of-location mitigates the energy consumption problem inherent in current proof-of-work approaches.

The concepts and technologies disclosed herein are described in the context of blockchain for cryptocurrencies as an example use case. It should be understood that the concepts and technologies disclosed herein are also applicable to other domains, such as, for example, digital asset management, evidence of data and documents, identity management, sharing data, and commercial use. Accordingly, the concepts and technologies disclosed herein should not be construed as being limited to uses within the cryptocurrency domain.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies location-based blockchain will be described.

Geospatial partition is natural in many blockchain applications. It is based on reliably mapping transactions to the location and time at which a transaction occurs, and providing a location certificate for verification. The location certificate is a digital proof that a device was at a particular place at a specific time. Global positioning system ("GPS") cannot be used for a location certificate because GPS can be spoofed. One method to produce location certificates is based on the existence of trusted localized corroborators that can provide the location certificate. This method is described below with reference to FIGS. 1 and 2.

Turning now to FIG. 1, an operating environment 100 in which a location certificate can be issued for a requester by a corroborator will be described, according to an embodiment. The illustrated operating environment 100 includes a user device 102 (operating as a requester) associated with a user 104 whose location is to be corroborated via a localized corroborator system 106 (operating as a corroborator). The user device 102 can be or can include a smartphone, a mobile computing device, a tablet computing device, a portable video game console, or any other device associated with the user 104 and capable of operating as a requester in accordance with the concepts and technologies disclosed herein. The localized corroborator system 106 can be or can include a server that has a known location, and that can only be accessed by the user device 102 within a specific range—referred to herein as a "local range." In some embodiments, the localized corroborator system 106 can be or can include a cell tower, including, for example, one or more base stations such as one or more eNode-Bs operating in accordance with one or more wireless telecommunications technologies. In some other embodiments, the localized corroborator system 106 can be or can include a wireless access point operating in accordance with a short-range wireless communications technology such as, but not limited to, IEEE 802.11x WI-FI, BLUETOOTH, ZIGBEE, Z-WAVE, and/or the like. In some embodiments, the localized corroborator system 106 can be or can include an optical access point that utilizes an optical communications technology such as, for example, infrared or other line of sight optical technology.

When the user device 102 is connected to the localized corroborator system 106, the user 104 is determined to be near (i.e., within the local range) the known location of the localized corroborator system 106. For embodiments in which the localized corroborator system 106 is or includes a BLUETOOTH, ZIGBEE, Z-WAVE, or infrared access point, the local range within which the user device 102 and the localized corroborator system 106 can be connected is within a few meters. For embodiments in which the localized corroborator system 106 is or includes a WI-FI access point, the local range within which the user device 102 and the localized corroborator system 106 can be connected is within tens of meters. For embodiments in which the localized corroborator system 106 is or includes a cell tower, the local range within which the user device 102 and the localized corroborator system 106 can be connected can be within a few miles. In other words, the local range is dependent upon the technology utilized by the localized corroborator system 106. Higher location accuracy can be achieved by taking into account a signal strength. The trustworthiness of certificates can be strengthened. For example, cryptographically signed geotags can be added to IP packets.

In the illustrated embodiment, the localized corroborator system 106 utilizes a unique pair of a public key 108 and a corroborator private key 110 as part of a public-key cryptosystem, such as RSA, although other public-key cryptosystems are contemplated. For the concepts and technologies directed to location-based blockchain disclosed herein, the localized corroborator system 106 can issue a location certificate 112 for the user device 102. The location certificate 112 holds a user private key ($k_{priv}$) 114 that remains concealed and only the public key 108 is revealed to the localized corroborator system 106. For a given pair ($k_{priv}$, $k_{pub}$) of private and public keys, the location certificate 112 attests that the user device 102 containing the user private key ($k_{priv}$) 114 was near the localized corroborator system 106 at the time the location certificate 112 was issued (shown as the location certificate 112').

Figure 2:
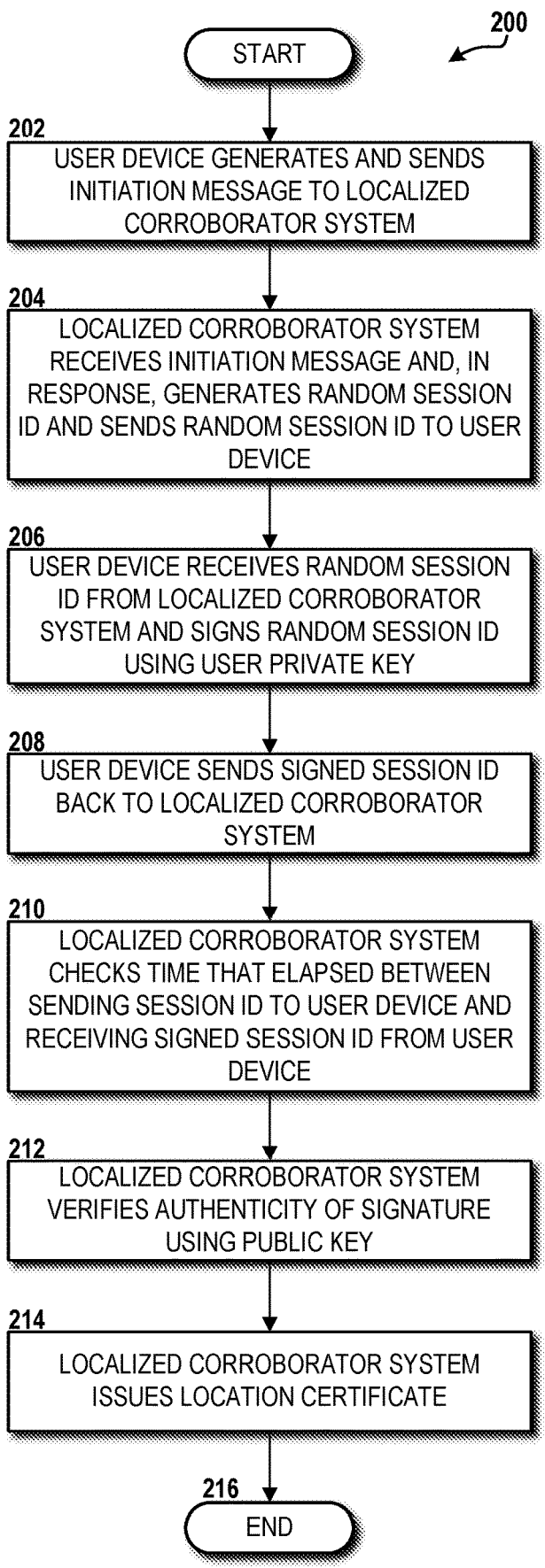
FIG. 2 is a flow diagram illustrating aspects of a method for issuing a location certificate for a requester by a corroborator, according to an embodiment.

An exemplary protocol for issuing location certificates 112 will now be described with reference to FIG. 2 and additional reference to FIG. 1. Turning now to FIG. 2, a method 200 for issuing location certificates 112 will be described, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods disclosed herein may be described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202, where the user device 102, operating as a requester, can generate and send an initiation message 116 (see FIG. 1), including the public key ($k_{pub}$) 108, to the localized corroborator system 106, operating as a corroborator. From operation 202, the method 200 proceeds to operation 204, where the localized corroborator system 106 can receive the initiation message 116 from the user device 102 and, in response, can generate a random session ID ($s_{id}$) 118 (see FIG. 1) and can send the random session ID ($s_{id}$) 118 to the user device 102.

From operation 204, the method 200 proceeds to operation 206, where the user device 102 can receive the random session ID ($s_{id}$) 118 from the localized corroborator system 106 and can sign the session ID ($s_{id}$) 118 using the user private key ($k_{priv}$) 114 to create a signed session ID 120 (see FIG. 1). From operation 206, the method 200 proceeds to operation 208, where the user device 102 can send the signed session ID 120 back to the localized corroborator system 106.

From operation 208, the method 200 proceeds to operation 210, where the localized corroborator system 106 can check the time that elapsed between sending the session ID ($s_{id}$) 118 to the user device 102 and receiving, in response, the signed session ID 120 from the user device 102 to verify that $t_2-t_1$<threshold (generally shown as 122 in FIG. 1). From operation 210, the method 200 proceeds to operation 212, where the localized corroborator system 106 verifies the authenticity of the signature of the session ID ($s_{id}$) 118 used to create the signed session ID 120 (generally shown at 124). When the time elapsed between sending the session ID ($s_{id}$) 118 to the user device 102 and receiving, in response, the signed session ID 120 from the user device 102 is less than a pre-defined threshold (e.g., less than a threshold of 5 milliseconds), the localized corroborator system 106 can issue, at operation 214, the location certificate 112, which includes the time, location, and the public key ($k_{pub}$) 108, signed by the corroborator private key 110 (generally shown at 126). The location contained in the location certificate 112 can include a precise location. Alternatively, the location contained in the location certificate 112, 112' can include a general location (e.g., a city, a county, or a state) to increase privacy. From operation 214, the method 200 proceeds to operation 216, where the method 200 ends.

The requester (e.g., the user device 102 in the illustrated example) cannot create the location certificate 112 without the corroborator (e.g., the localized corroborator system 106 in the illustrated example) because, to be valid, the location certificate 112 requires the signature of the corroborator. The session ID ($s_{id}$) 118 can only be signed after the beginning of the session because the session ID ($s_{id}$) 118 is unknown before the session starts. Therefore, after the session is initiated, a device (e.g., the user device 102) that can sign the session ID ($s_{id}$) 118 with a private key (e.g., the user private key ($k_{priv}$) 114) must be near the corroborator (e.g., the localized corroborator system 106) to provide a response with a latency that is smaller than a given threshold.

As used herein, a certified transaction can be represented as a pair (t, C) of a transaction t=(x→y, m) and the location certificate C 112, where the public key ($k_{pub}$) 108 of y is used to create the location certificate 112. As explained above, the location certificate 112 is created by a device that at the certified time is near the corroborator and contains the private key of y.

Blockchain partitioning will now be described. In public blockchains, such as Bitcoin and Ethereum, the transaction rates are low. One of the reasons for the low transaction rate is the serialization of all transactions, even those that are not conflicting. If the transactions are partitioned into groups so that transactions from different groups can never be in conflict, non-conflicting transactions can be processed in parallel, and blocks of non-conflicting transactions can be generated in parallel. This can be achieved by creating a partition of the blockchain into a hierarchy of blockchains (i.e., sub-blockchains) and associating transactions with different nodes of the hierarchy. Each sub-blockchain can be managed independently, so blocks of different sub-blockchains can be created and added to the appropriate sub-blockchain in parallel.

The study of parallel creation of blocks led to the development of the BlockDAG data structure, where a new block can extend several previous blocks, not just one, and the "heaviest" tree is selected in a greedy fashion (e.g., using the GHOST protocol). The SPECTRE protocol utilizes BlockDAG for a virtual vote on the order of the blocks to achieve high throughput and fast confirmation time. Two other notable attempts to cope with the low transaction rates in public blockchains are Bitcoin-NG and Algorand. Bitcoin-NG speeds up block creation by electing a leader for a specified epoch, and allowing the leader to create a large number of blocks till the next leader is elected. Algorand employs a sophisticated method of randomly selecting a small group of users (who are replaced when their identity is revealed) and executing a *Byzantine* Agreement protocol by the chosen users to prevent forks altogether.

The location-based blockchain concepts and technologies disclosed herein are orthogonal to the aforementioned blockchain technologies. In a hierarchy of linked sub-blockchains, any blockchain implementation can be used, including Bitcoin, Bitcoin-NG, Algorand, and others. The hierarchical structure might even link different types of blockchain. Scalability is achieved by adding new sub-blockchains to the hierarchy without changing the technology or performing a hard fork. Different hierarchies can be used.

Figure 3:
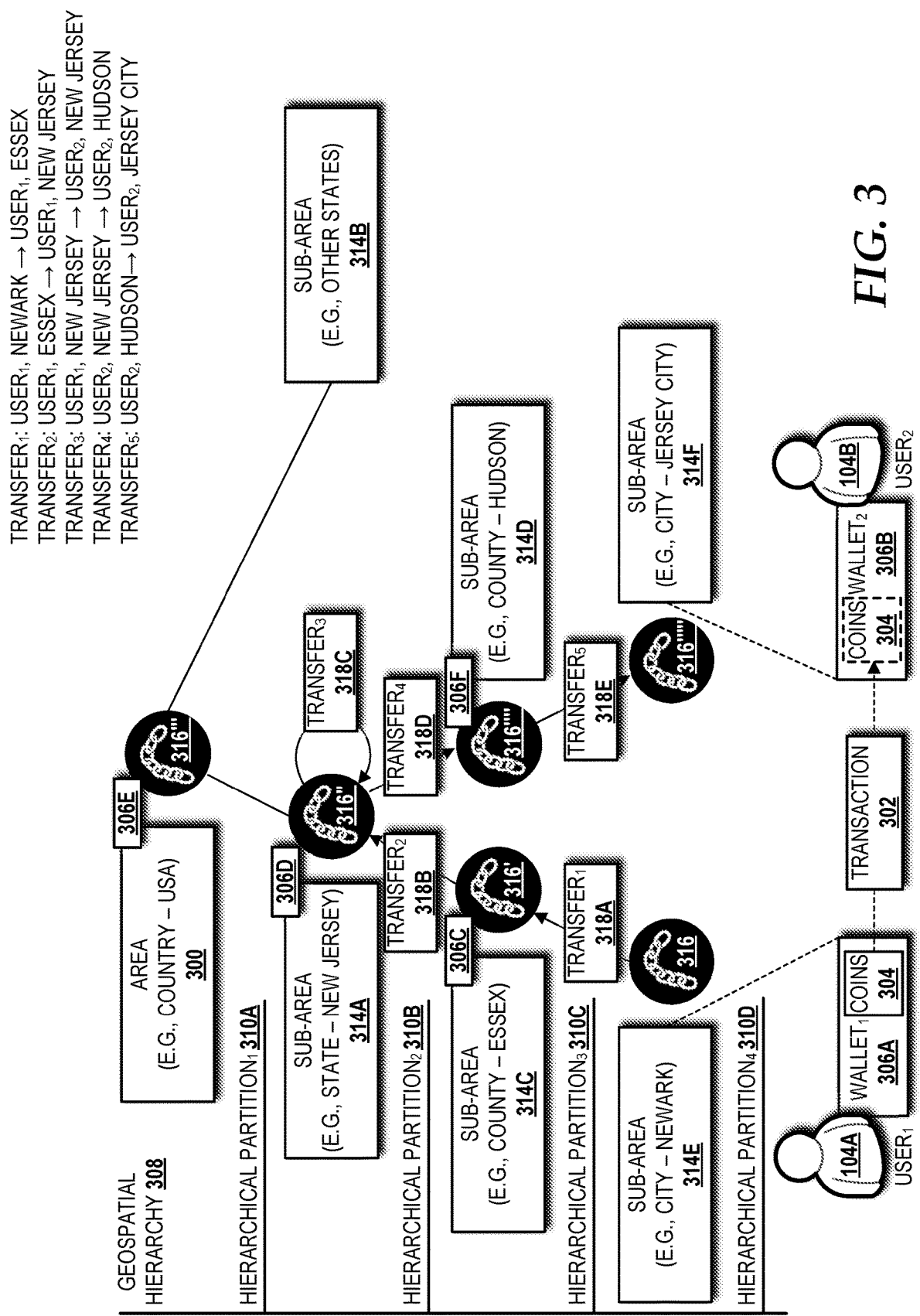
FIG. 3 is a block diagram illustrating an example of hierarchical partitioning and a transfer, according to an embodiment.

Turning now to FIG. 3, a block diagram illustrating a hierarchical partitioning of an area 300 and a transaction 302 of one or more coins 304 from a first wallet 306A associated with a first user 104A to a second wallet 306B associated with a second user 104B will be described, according to an illustrative embodiment. FIG. 3 shows a geospatial hierarchy 308, although the concepts and technologies disclosed herein can be applied to other hierarchy types. For example, the geospatial hierarchy 308 can include partitions into neighborhoods, cities, counties, states, and countries. This type of partition is suitable, for example, when using blockchains to record real estate transactions. Another partition example is a partition into business units of a large global company, such as teams, departments, divisions, sub-organizations, and the like. This type of partition can be applied when a company ledger is used for recording processes, data sharing, code transfer, and the like.

The illustrated geospatial hierarchy 308 includes a plurality of hierarchical partitions 310. In particular, a first hierarchical partition 310A includes the area A 300 that, in turn, includes a set of sub-areas A' 314 located within the remaining hierarchical partitions 310B-310D. The first hierarchical partition 310A represents countries, and in particular, the area A 300, in the illustrated example, represents the United States of America. The second hierarchical partition 310B includes a first sub-area 314A of the set of sub-areas A' 314 and a second sub-area 314B of the set of sub-areas A' 314. The second hierarchical partition 310B represents states (or alternatively regions, provinces, or the like depending upon the subject country), and in particular, the first sub-area 314A, in the illustrated example, represents the state of New Jersey, and the second sub-area 314B represents a collection of other states (not explicitly named). The third hierarchical partition 310C includes a third sub-area 314C of the set of sub-areas A' 314 and a fourth sub-area 314D of the set of sub-areas A' 314. The third hierarchical partition 310C represents counties within the states in the second hierarchical partition 310B, and in particular, the third sub-area 314C, in the illustrated example, represents the county of Essex in the state of New Jersey, and the fourth sub-area 314D represents the county of Hudson in the state of New Jersey. The fourth hierarchical partition 310D includes a fifth sub-area 314E of the set of sub-areas A' 314 and a sixth sub-area 314F of the set of sub-areas A' 314. The fourth hierarchical partition 310D represents cities within the counties in the third hierarchical partition 310C, and in particular, the fifth sub-area 314E, in the illustrated example, represents the city of Newark in the county of Essex, and the sixth sub-area 314F represents the city of Jersey City in the county of Hudson.

The concepts and technologies disclosed herein can utilize geospatial partitioning with the underlying assumption that most transactions are local (e.g., cash exchange between people who are geographically near one another), and this might also be true for a cryptocurrency that aims specifically to replace cash. Other usages of geospatial partition are real estate transactions, supply chains, management of data in smart cities, and the like. The hierarchy provides a tradeoff between privacy and efficiency, where local transactions are more efficient but less private and non-local transactions are more private but less efficient.

A localized blockchain 316 can be defined with respect to the area A 300 (e.g., the United States). Localization is with respect to the hierarchical partitions 310 of the area A 300, and each blockchain wallet 306 is associated with a sub-area in the set of sub-areas A' 314. For example, in the first hierarchical partition 310A of the United States, the country is partitioned into states (shown in the second hierarchical partition 310B), the states are partitioned into counties (shown in the third hierarchical partition 310C), and the counties are partitioned into cities and towns (shown in the fourth hierarchical partition 310D). A transaction performed within a city is registered merely in that city. A transfer of cryptocurrency (e.g., Bitcoin) from a city in one county to a city in another county (e.g., as is the case in the illustrated transaction 302), within the same state, is registered in the relevant cities, counties, and the state. A transfer of cryptocurrency across states is recorded in all the levels of the geospatial hierarchy 308.

Partitioning a blockchain makes local transactions faster and cheaper than non-local transactions. This is because a local transaction is notarized for a local area and "competes" with fewer transactions. When moving higher in the hierarchy, each transaction might need to compete with transactions from a wider area—this will increase privacy, but also is expected to increase the transaction delay (i.e., lengthen the wait time until the transaction is recorded in the blockchain).

The geospatial hierarchy 308 is the result of a recursive partitioning of the area A 300. As introduced above, the area A 300 can include the set of subareas A' 314. A specific hierarchical partition can be defined as $H=(T, \alpha)$ (310) of the area A 300, including a tree $T=(V, E, v_{root})$ and a function $\alpha$: $V \rightarrow A$, where V, E, and $v_{root}$ are the vertexes, edges, and root of T, respectively. The function $\alpha$ maps each vertex v to a specific sub-area in the set of sub-areas A' 314 such that for each node v that is not a leaf:

$$\alpha(v) = \bigcup_{u \in children(v)} \alpha(u), \text{ and} \quad (1)$$

$$\alpha(u_1) \cap \alpha(u_2) = \emptyset \, \forall u_1 \neq \forall u_2 \in children(v). \quad (2)$$

That is, the sub-areas associated with the children of a vertex v are a partition of the area associated with v.

The blockchain wallet 306 is localized by association with a node of the hierarchical partition H 310. The variable W can be defined as a set of all blockchain wallets (e.g., the blockchain wallets 306A-306F in FIG. 3; collectively, as the set of blockchain wallets W 306), such that $\lambda: W \rightarrow V$ is a function that maps the set of blockchain wallets W 306 to the nodes of the hierarchical partition H 310. A specific blockchain wallet $w \in W$ is associated with the area $\alpha(\lambda(w))$. Thus, the transaction $t=(x \rightarrow y, m)$ is local if $\lambda(x)=\lambda(y)$ is a leaf of the hierarchical partition H 310. Otherwise, the least common ancestor of the transaction t is the least common ancestor lca(x, y) in the tree T. The area of the transaction t can be defined as $\alpha(lca(x, y))$.

A certification requirement allows only processing of certified transactions (t, C). When including a certified transaction in the blockchain 316, the location certificate C (e.g., the location certificate 112) should be verified as valid and includes the public key 108 of the receiving wallet y (e.g., the second wallet 306B receiving the coin(s) 304 from the first wallet 306A in the illustrated example). The location in the location certificate C 112 should be inside the area of the receiving wallet y 360—that is, within α(λ(y)) (i.e., the sub-area 314F—Jersey City).

Three types of transfers 318 are described herein. A "lateral transfer" is a transfer between blockchain wallets 306 in the same node (e.g., a third transfer 318C is a lateral transfer). An "ascending transfer" is a transfer from a blockchain wallet 306 in a node v to a blockchain wallet 306 in the parent of node v (e.g., a first transfer 318A from the first blockchain wallet 306A to the third blockchain wallet 306C is an ascending transfer, as is a second transfer 318B). A "descending transfer" is a transfer from a blockchain wallet 306 in a node v to a blockchain wallet 306 in a child of v (e.g., a fourth transfer 318D from the fourth blockchain wallet 306D to the fifth blockchain wallet 306F is a descending transfer, as is a fifth transfer 318E). The blocks of each node of the hierarchical partition H 310 are managed separately from the blocks of the other nodes, with a distinct blockchain 316 for each node. To increase the efficiency, blocks associated with different nodes can be created in parallel.

To prevent double spending, each transaction t=(x→y, m) is to be added to the blockchain 316 of the node associated with x to get accepted. The transaction t'=(y→z, n) that follows the transaction t is added to the blockchain 316 of the node associated with y. A local transaction that is related to node v is added to blockchain (v) as a lateral transfer. A non-local transaction from x to y is translated to a sequence of transfers along the shortest path from x to y in T. For example, a transfer of coins 304 between two blockchain wallets 306 located within Chicago is local and requires a single lateral transfer (similar to the third transfer 318C in the illustrated example). A transfer from the first blockchain wallet 306A of the first user 104A in the fifth sub-area 314E, represented in the illustrated example as Newark, N.J., to the second blockchain wallet 306B of the second user 104B in the sixth sub-area 314F, represented in the illustrated example as Jersey City, N.J., requires the five transfers 318A, 318B, 318C, 318D, 318E depicted in FIG. 3.

Figure 4:
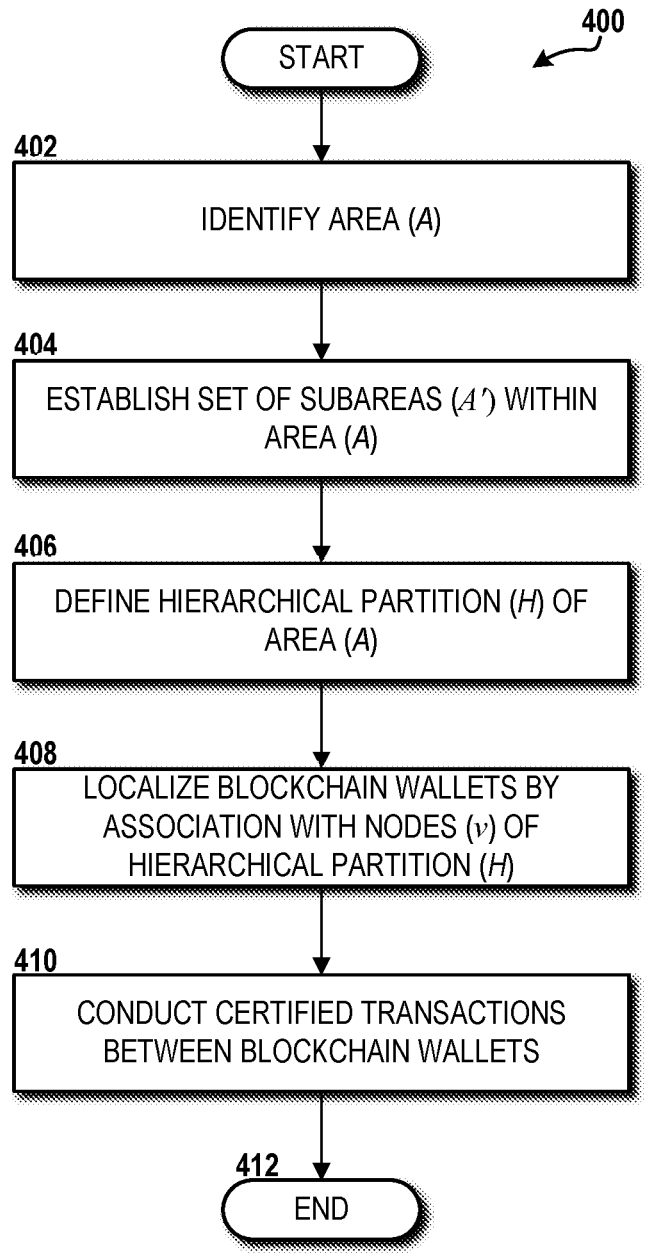
FIG. 4 is a flow diagram illustrating aspects of a method for hierarchical partitioning of an area, according to an embodiment.

Turning now to FIG. 4, a method 400 for hierarchical partitioning of an area, such as the area 300, will be described according to an embodiment. The method 400 will be described with reference to FIG. 4 and additional reference to FIG. 3 for context. The method 400 begins and proceeds to operation 402, where an area, such as the area 300, can be identified. From operation 402, the method 400 proceeds to operation 404, where a set of subareas within the area, such as the subareas 314A-314F within the area 300, can be established. From operation 404, the method proceeds to operation 406, where one or more hierarchical partitions can be defined for the area, such as one or more of the hierarchical partitions 310. From operation 406, the method 400 proceeds to operation 408, where blockchain wallets, such as the blockchain wallets 306A-306F, can be localized by association with nodes of the hierarchical partition(s) defined at operation 406. From operation 408, the method 400 proceeds to operation 410, where certified transactions, such as the transaction 302, can be conducted between two or more of the blockchain wallets 306. From operation 410, the method 400 proceeds to operation 412, where the method 400 ends.

A geographic partition can be realized in different ways depending on how people use money. Several transfers are needed for non-local transactions, but blocks of different blockchains are created in parallel. For anonymity, users 104 can choose the level at which to execute transactions with the understanding that a higher level provides a more obfuscated exposure of the user's location. There is, however, a tradeoff between privacy and the time that elapses until a transaction is added to the blockchain.

Non-geographic partitions are also contemplated. In a large corporation, for instance, a partition based upon the divisions and subdivisions of the corporation could be used to manage company transactions, in a manner similar to a geospatial partition.

Partitioning of blockchains 316 can be used to strengthen security. Geofencing is provided as one example. A private key (e.g., the user private key 114) of a blockchain wallet can be stolen, which may lead to the loss of the coins. By geofencing wallets, coins can be more secure. In geofencing, a wallet is associated with an area. For executing a transaction, the payee needs to provide a location certificate for a place within the area of the payer's wallet, at the time of the transaction. If, for example, Alice associates her wallet with her neighborhood, a malicious attacker from a different country, say Mallory, would be limited in her ability to spend the money. Even if Mallory were to steal the private key of Alice, to create a location certificate and transfer the coins she would need to have a device in Alice's neighborhood with the private key of the receiving wallet. If Mallory were to use as a proxy a device in Alice's neighborhood, to create a location certificate on her behalf, she would need to surrender her private key to the proxy. Hence, the taken money could be spent by the proxy. This would make cryptocurrencies more secure. The stronger security would also make it safer to create backups for a lost key. Note that Alice could transfer money from her local wallet to a wallet associated with her state, if she wants to use the money when traveling within the state.

Geofencing can be done by requiring a location certificate from the payee, the payer or from both, to restrict, at the time of the transaction, the location of the payer, the payee or of both. Note that geofencing strengthens the security provided by the private keys, it does not replace the private keys. There is a tradeoff between security and privacy here—that is, a smaller area provides more security but less privacy, and vice versa. Geofencing can be applied to various applications of blockchain. For example, in a blockchain that supports a supply chain, transactions of item transfer could be limited to the warehouses—that is, transaction would only be recorded at the warehouses, to provide strict control over transfers and the registration thereof.

Blockchains that are based on proof-of-work consume an excessive amount of energy. A partition of the blockchain could increase the amount of energy that is required to sustain the system. Location certificates can be used to establish proof-of-location as a non-wasteful alternative to proof-of-work to achieve consensus in a public blockchain.

Over the years, proof-of-work has been proven to be a successful and reliable consensus mechanism for a public (permissionless) blockchain like Bitcoin, and capable of preventing a Sybil Attack. The main limitation of proof-of-work, however, is the immense energy consumption that is required to maintain the system. Miners who create a block are rewarded for that by receiving transaction fees or a block-creation incentive. Miners compete to create blocks, and thus, many miners spend significant computation power on finding a suitable nonce for each block. Moreover, if miners would collude, they could issue a 51% attack or in some cases, even a 25% attack. This is a real threat because Bitcoin miners are already organized into large groups and share their computational resources to create blocks.

Several methods have been proposed as an alternative to proof-of-work. One such method is proof-of-stake, where the voting power is given to "stake holders" of the system (i.e., those who have coins). The creator of a block needs to provide a cryptographic proof of existence of a certain amount of coins in its possession, and these coins are locked till some conditions are met. This approach was criticized as non-resilient to forks, since, unlike in proof-of-work, the expected gain from working on more than one branch is often higher than the cost of doing so. Moreover, in this method, peers with many coins could delay the creation of new blocks (when they are selected to create the next block) and could use that for extortion, or in an attempt to attack the system for an external gain.

In proof-of-disk-space, the creators of blocks need to waste disk space to create a block. Like proof-of-work, proof-of-disk-space is a wasteful approach. A consensus protocol to cope with the case where an unknown number of peers could be offline has been suggested in the blockchain community.

Several solutions have been designed for private (permissioned) blockchains. Practical Byzantine Fault Tolerance ("PBFT") was proposed as a method to reach consensus by voting, but it requires knowing the number of peers, so it is unsuitable for a public blockchain in which joining the peer-to-peer network is open to the public. Proof-of-authority was developed for private blockchains, with trusted entities as authorities. Proof-of-authority relies on establishing trust in the peer-to-peer network.

The concepts and technologies disclosed herein for location-based blockchain can utilize a proof-of-location method as an alternative to proof-of-work. A goal of proof-of-location is to avoid waste when creating a block, and yet keep the process decentralized and independent of knowledge about the reputation of peers, or their number. Proof-of-location is based upon the ability to create a location certificate to provide a location proof for a particular place to create the next block.

The blockchain is created such that a location l is selected in each step, in an unpredictable way, and the next block is the block that was created by the peer with the proof-of-location closest to the selected location. If two location certificates have the same distance from the selected location, the location certificate with the smallest time stamp can be selected.

The selection of a location (l) can be done in different ways. One non-limiting way is as follows. Consider a geographical area in which the block creators (peers) are active (e.g., USA). Let G be a grid that covers this geographical area. Let $c_1, \ldots, c_m$ be the cells of G. Let B be the last block in the blockchain, so far, and h(B) the hash of B. The selected location is the center of the cell number h(B) mod m (i.e., $c_{h(B) \mod m}$ of G. This yields a cell whose coordinates cannot be computed without knowing B. Note that for a hash function h whose digest has a size of 256 bits, even if the remainder of the division $2^{256}/m$ is non-zero, the difference between $$\left\lfloor \frac{2^{256}}{m} \right\rfloor \text{ and } \left\lfloor \frac{2^{256}}{m} \right\rfloor + 1$$

is negligible, so if h is uniform, then the selection of cells can, practically, be regarded as uniform.

To control the hardness of block creation, so that an attacker could not create an alternative branch fast, the distance of the location certificate from l can be limited by an adaptable inflating bound. In one embodiment, let $t_{prev}$ be the creation time of the last block. The inflating distance limit is $(t) = \delta \cdot \text{minutes}(t - t_{prev})^k$, for a given k and $\delta$. A location certificate with location and time $(l_p, t_p)$ satisfies the distance limit if $\text{distance}(l_p, l) < d(t_p)$. For k=3 and $\delta$=100 meters, in the first minute (time difference<1), the location certificate should be for a location that is less than 100 meters from l. In the second minute (time difference<2), the location certificate should be for a location that is less than 800 meters from l. The distance limit (in meters) as a function of the time difference (in minutes) evolves as follows: (2, 800), . . . , (4, 6400), . . . , (8, 512, 000), . . . , (10, 100, 000), . . . . With these parameters, the distance limit is 100 kilometers after 10 minutes, and covers the area of the USA after about half an hour. (These parameters can be changed to control the block creation rate, and guarantee that blocks will be created within a reasonable time.)

An attacker that would try to change a block and then create the longest branch, by competing with the other miners, would need to produce location certificates faster than the other miners. However, without a machine and a corroborator near any arbitrary location l, the attacker would need to wait (e.g., if its nearest machine to l is 100 kilometers, it would need to wait 10 minutes), and during that time the other miners would add blocks to the main chain. Note that with machines that cover an area of 10 km², about 1,000,000 machines would be needed to cover the area of the USA.

An advantage of the proposed method is that, unlike in Bitcoin, if the locations of the peers (miners) are arbitrary, a group of miners that collude do not have an advantage over a group that does not collude. This would make the system less vulnerable to colluding peers. Furthermore, for an attacker it will be hard to create blocks fast, even with a large computation power, because the computation power would not help arriving at l or getting close to l faster.

The concept of fork prevention in accordance with the concepts and technologies disclosed herein will now be described. When two or more branches are constructed in parallel without being abandoned, forks occur. Forks cause the blockchain to be less reliable, and reduce consistency. To cope with this, the miners would continue the longest branch created thus far. But there is also a need to discourage the miners from extending other branches. In proof-of-work, the computation of a nonce is demanding, so miners have an incentive to invest their computation power only on the branch with the highest chance of success (i.e., the longest branch). This can be achieved in proof-of-location if there is a cost to each location certificate (e.g., where miners would pay to the corroborators for each creation of a location certificate). It should be noted that in proof-of-work, miners pay for block creation in their electricity bills. A payment would encourage miners to only "invest" in a branch with a high chance of success. The payment can be adaptive, including l in the location certificate and making the fee proportional to the distance between the corroborator and l, to discourage miners that are geographically far from l from creating a block.

In proof-of-location, the miners create location certificates and reveal their location. This, however, does not affect users—that is, there is no disclosure of the locations of the payers or the payees whose transactions are added to a block. It is an open question, however, whether revealing the location of miners is much different from revealing their IP addresses, as being done anyway in the peer-to-peer network. In particular, miners can hide their IP address (e.g., by using onion routing, but this would slow them down in the "race" to create a block). Such a tradeoff between privacy and effectiveness also can be made in proof-of-location, where a miner may decide only to create location certificates by a mobile device when she/he is far from her/his home or office.

In proof-of-location, the system remains decentralized because location certificates are not produced by a single entity. The location certificate may be produced by different companies and organizations using network access points (e.g., modifying all the cell towers to serve as corroborators). For a company that would not provide reliable certificates, the blocks with its certificates would not be accepted by the majority of the miners, and hence, users will stop acquiring certificates from that company. Hence, the incentive of certificate providers to be honest is similar to that of miners in a public blockchain like Bitcoin.

To create a location certificate there is a need to be near the corroborator. Therefore, forging many identities that are located in a single place does not increase the ability to create a block if proof-of-location is used. Also, having more machines or stronger machines in proximity to a single corroborator does not give an advantage. A miner could try to deploy many machines in many remote places. This, however, would require investment in equipment and would incur maintenance costs, and unlike Bitcoin mining farms could not be in a single location.

An attacker may try to apply cryptojacking to use machines of other users to create location certificates, somewhat like unauthorized use of machines for Bitcoin mining. But in such a case, to create the location certificate, the attacker would need to expose the private key of the wallet that would receive the incentive fee (this key is necessary to create the location certificate). Any hijacked machine would then have the private key that would allow it to spend the new coins.

To increase security, there should be many corroborators distributed over a large area. More importantly, each corroborator should have a different private key—if the security of a corroborator is breached, using its key for creating fake certificates would be limited to a single location.

Blockchain has the potential to revolutionize data sharing among organizations and individuals, by providing a decentralized, transparent and tamper-proof storage of transactions. It is the underlying technology of many cryptocurrencies, and is adapted for other uses. However, currently blockchains are not scalable (due, in part, to the low transaction rate), and public blockchains are wasteful (require a high usage of electricity to support proof-of-work), and insecure (provide no protection from theft of a private key). The concepts and technologies disclosed herein present a novel approach of partitioning the blockchain into a tree of sub-chains based on a real-world hierarchy, such as a geographical or an organizational partition, where transactions of different sub-chains do not conflict with one another. Such a partition provides a tradeoff between efficiency and privacy—high levels provide more privacy than low levels but a longer expected wait till the transaction is added to a block, and vice versa. Scalability can be achieved by partitioning leaf nodes in which the transaction rate is too high.

An important advantage of the hierarchical partitioning is that there is no need to develop a new technology or perform hard forks to cope with scalability issues. A recent debate about how to increase the block size of Bitcoin illustrates how difficult it is to make changes in public blockchains.

Geographic partitioning combined with location certificates can be used to increase security by applying geofencing. With the growing popularity of cryptocurrencies and their usage in applications that do not require privacy, strengthening security by restricting usage of coins to specified locations could proliferate utilization of cryptocurrencies.

The partition of the blockchain may inflate the excessive energy consumption caused by proof-of-work. Thus, a novel, non-wasteful proof-of-location method is disclosed herein to achieve consensus for block creation. In proof-of-location, unlike proof-of-work or proof-of-stake, having a strong computation power or many coins does not increase the chances of creating the next block. This has the potential of providing higher stability than that of proof-of-work or proof-of-stake.

It should be understood that the concepts and technologies disclosed herein regarding the use of partitions to create sub-chains can be generalized from hierarchies to a network of blockchains (e.g., by connecting existing blockchains).

Figure 5:
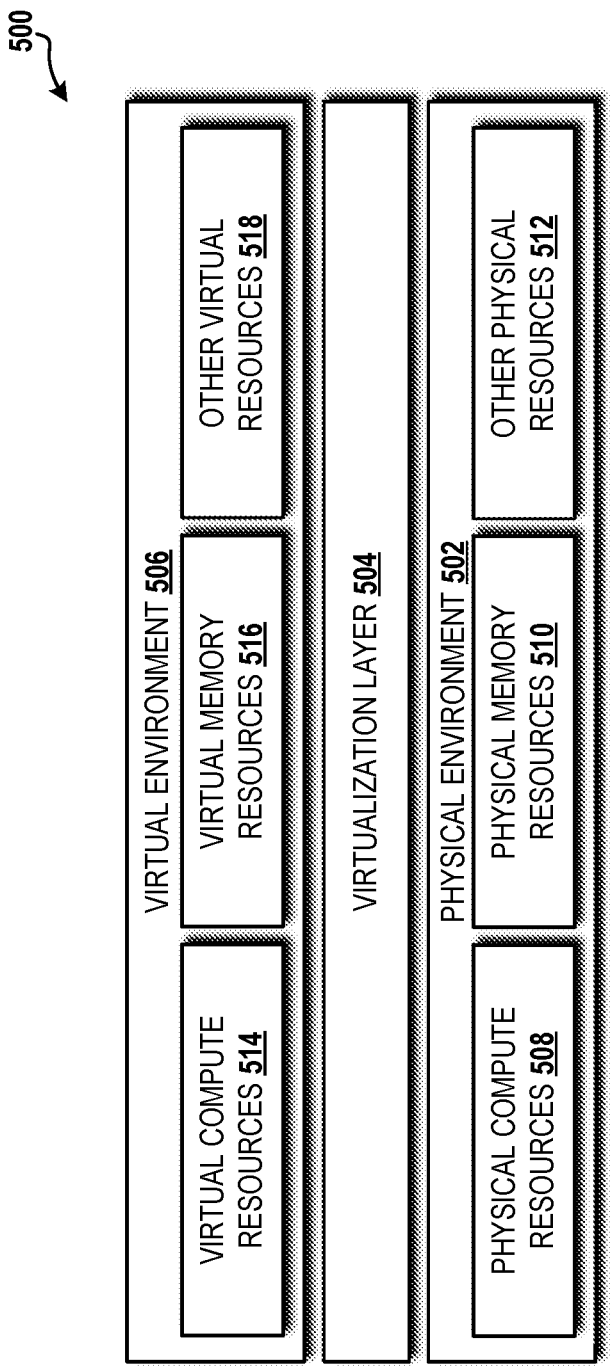
FIG. 5 is a block diagram illustrating an example cloud environment capable of implementing aspects of the embodiments presented herein.

Turning now to FIG. 5, an illustrative cloud environment 500 will be described, according to an illustrative embodiment. The cloud environment 500 includes a physical environment 502, a virtualization layer 504, and a virtual environment 506. While no connections are shown in FIG. 5, it should be understood that some, none, or all of the components illustrated in FIG. 5 can be configured to interact with one other to carry out various functions described herein. In some embodiments, the components are arranged so as to communicate via one or more networks. Thus, it should be understood that FIG. 5 and the remaining description are intended to provide a general understanding of a suitable environment in which various aspects of the embodiments described herein can be implemented, and should not be construed as being limiting in any way.

The physical environment 502 provides hardware resources, which, in the illustrated embodiment, include one or more physical compute resources 508, one or more physical memory resources 510, and one or more other physical resources 512. The physical compute resource(s) 508 can include one or more hardware components that perform computations to process data and/or to execute computer-executable instructions of one or more application programs, one or more operating systems, and/or other software.

The physical compute resources 508 can include one or more central processing units ("CPUs") configured with one or more processing cores. The physical compute resources 508 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 508 can include one or more discrete GPUs. In some other embodiments, the physical compute resources 508 can include CPU and GPU components that are configured in accordance with a co-processing CPU/GPU computing model, wherein the sequential part of an application executes on the CPU and the computationally-intensive part is accelerated by the GPU processing capabilities. The physical compute resources 508 can include one or more system-on-chip ("SoC") components along with one or more other components, including, for example, one or more of the physical memory resources 510, and/or one or more of the other physical resources 512. In some embodiments, the physical compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 508 can be or can include one or more hardware components architected in accordance with an ARM architecture, available for license from ARM HOLDINGS of Cambridge, United Kingdom. Alternatively, the physical compute resources 508 can be or can include one or more hardware components architected in accordance with an x86 architecture, such an architecture available from INTEL CORPORATION of Mountain View, Calif., and others. Those skilled in the art will appreciate the implementation of the physical compute resources 508 can utilize various computation architectures, and as such, the physical compute resources 508 should not be construed as being limited to any particular computation architecture or combination of computation architectures, including those explicitly disclosed herein.

The physical memory resource(s) 510 can include one or more hardware components that perform storage/memory operations, including temporary or permanent storage operations. In some embodiments, the physical memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 508.

The other physical resource(s) 512 can include any other hardware resources that can be utilized by the physical compute resources(s) 508 and/or the physical memory resource(s) 510 to perform operations described herein. The other physical resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 502 can be virtualized by one or more virtual machine monitors (not shown; also known as "hypervisors") operating within the virtualization/control layer 504 to create virtual resources that reside in the virtual environment 506. The virtual machine monitors can be or can include software, firmware, and/or hardware that alone or in combination with other software, firmware, and/or hardware, creates and manages virtual resources operating within the virtual environment 506.

The virtual resources operating within the virtual environment 506 can include abstractions of at least a portion of the physical compute resources 508, the physical memory resources 510, and/or the other physical resources 512, or any combination thereof. In some embodiments, the abstractions can include one or more virtual machines upon which one or more applications can be executed.

Figure 6:
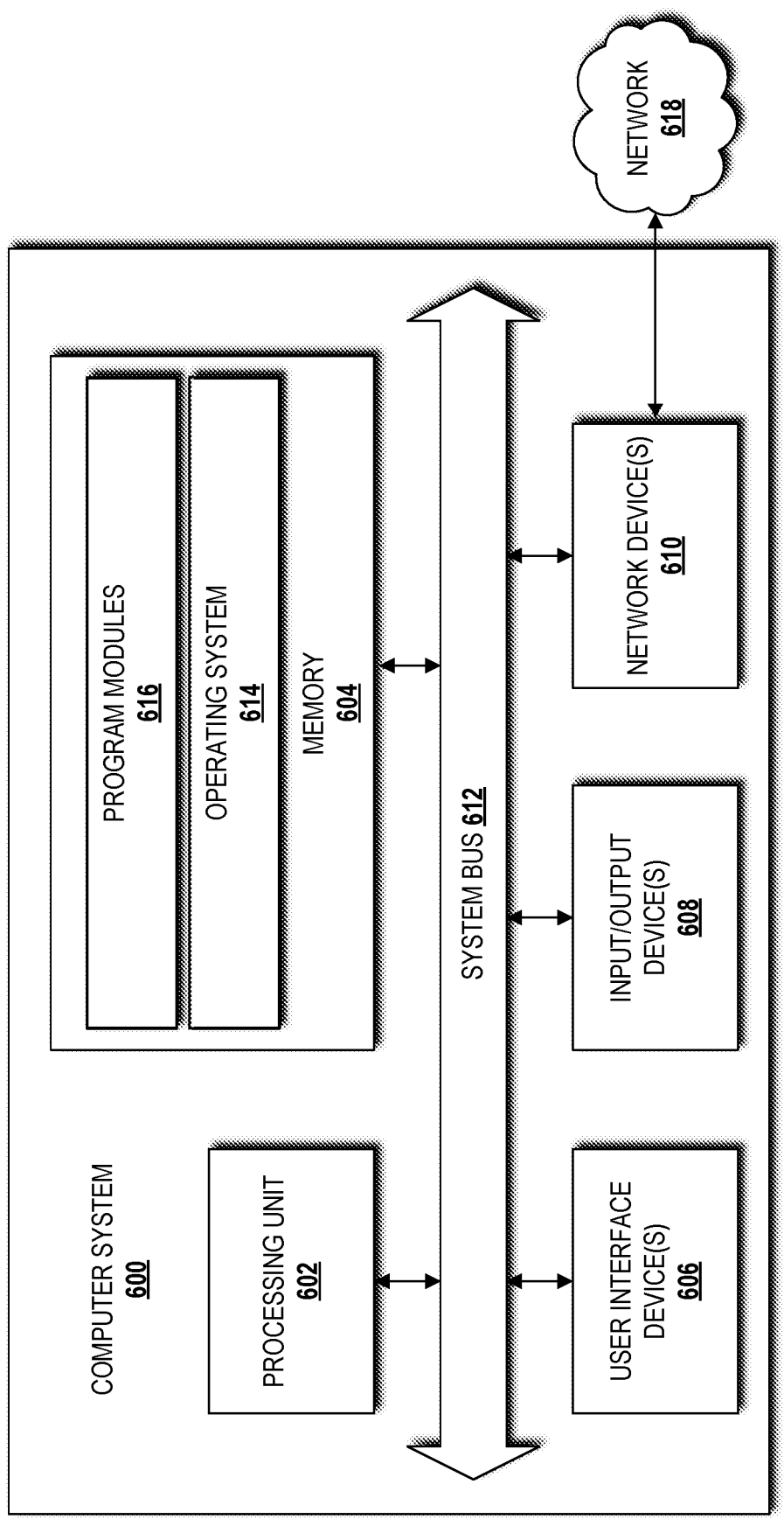
FIG. 6 is a block diagram illustrating an example computer system and components thereof capable of implementing aspects of the embodiments presented herein.

Turning now to FIG. 6, a block diagram illustrating a computer system 600 configured to provide the functionality in accordance with various embodiments of the concepts and technologies disclosed herein will be described. The systems, devices, and other components disclosed herein can utilize, at least in part, an architecture that is the same as or at least similar to the architecture of the computer system 600. For example, the user device(s) 102 and/or the localized corroborator system(s) 106 can utilize, at least in part, an architecture that is the same as or at least similar to the architecture of the computer system 600. It should be understood, however, that modification to the architecture may be made to facilitate certain interactions among elements described herein.

The computer system 600 includes a processing unit 602, a memory 604, one or more user interface devices 606, one or more I/O devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistant ("PDAs"), cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), or a wired Metropolitan Area Network ("MAN").

Figure 7:
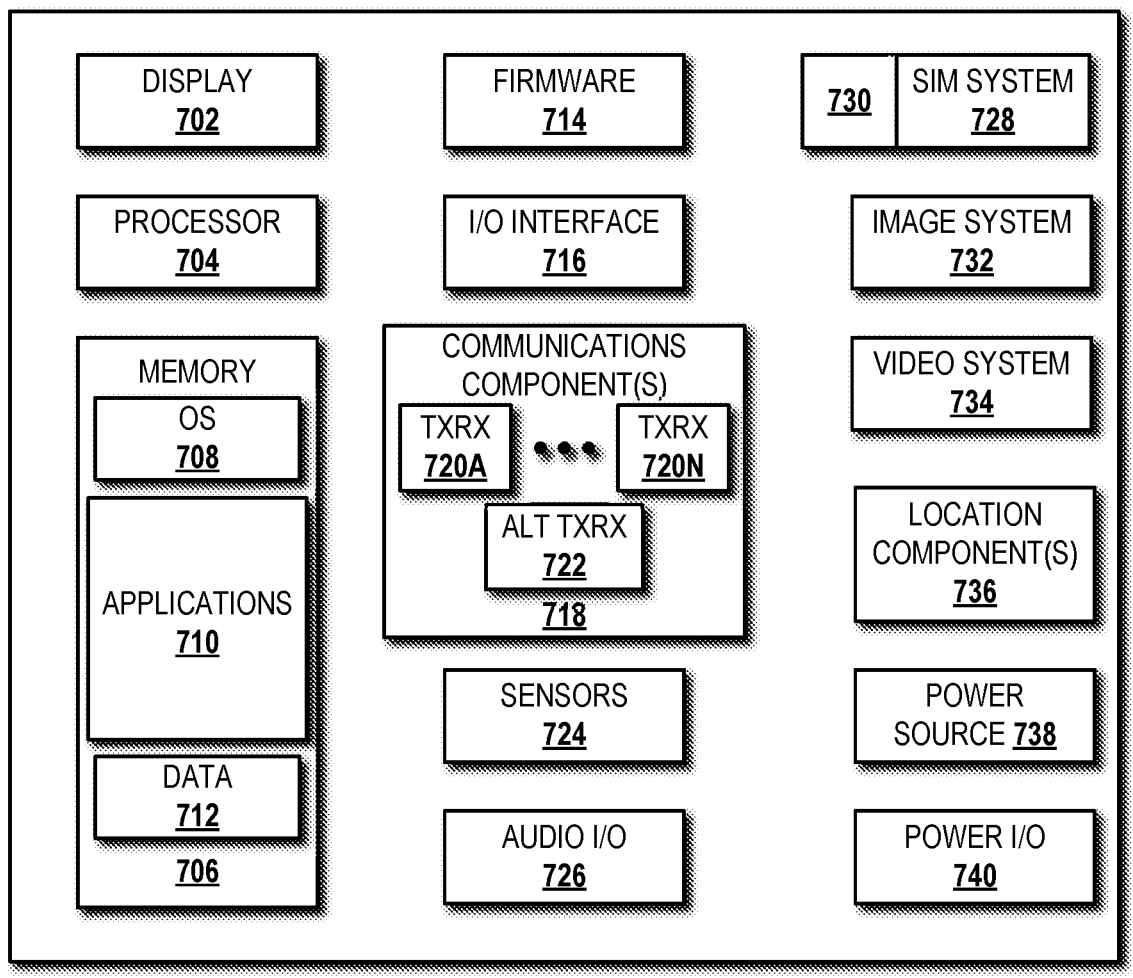
FIG. 7 is a block diagram illustrating an example mobile device and components thereof capable of implementing aspects of the embodiments presented herein.

Turning now to FIG. 7, an illustrative mobile device 700 and components thereof will be described. In some embodiments, the user device(s) 102 and/or the localized corroborator system 106 can be configured like the mobile device 700. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. In some embodiments, the applications 710 also can include a user interface ("UI") application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 710, the data 712, and/or portions thereof can be stored in the memory 706 and/or in a firmware 714, and can be executed by the processor 704.

The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as database data, location information, user information, organization information, presence status information, user IDs, passwords, and application initiation (start-up) requests. In some embodiments, the I/O interface 716 can include a hardwire connection such as universal serial bus ("USB") port, a mini-USB port, a micro-USB port, an audio jack, a PS2 port, an Institute of Electrical and Electronics Engineers ("IEEE") 794 ("FIREWIRE") port, a serial port, a parallel port, an Ethernet (RJ45) port, an RHO port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communications ("GSM"), Code-Division Multiple Access ("CDMA") ONE, CDMA2000, Long-Term Evolution ("LTE"), and various other 2G, 2.5G, 3G, 4G, 5G, and greater generation technology standards. Moreover, the communications component 718 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 718 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
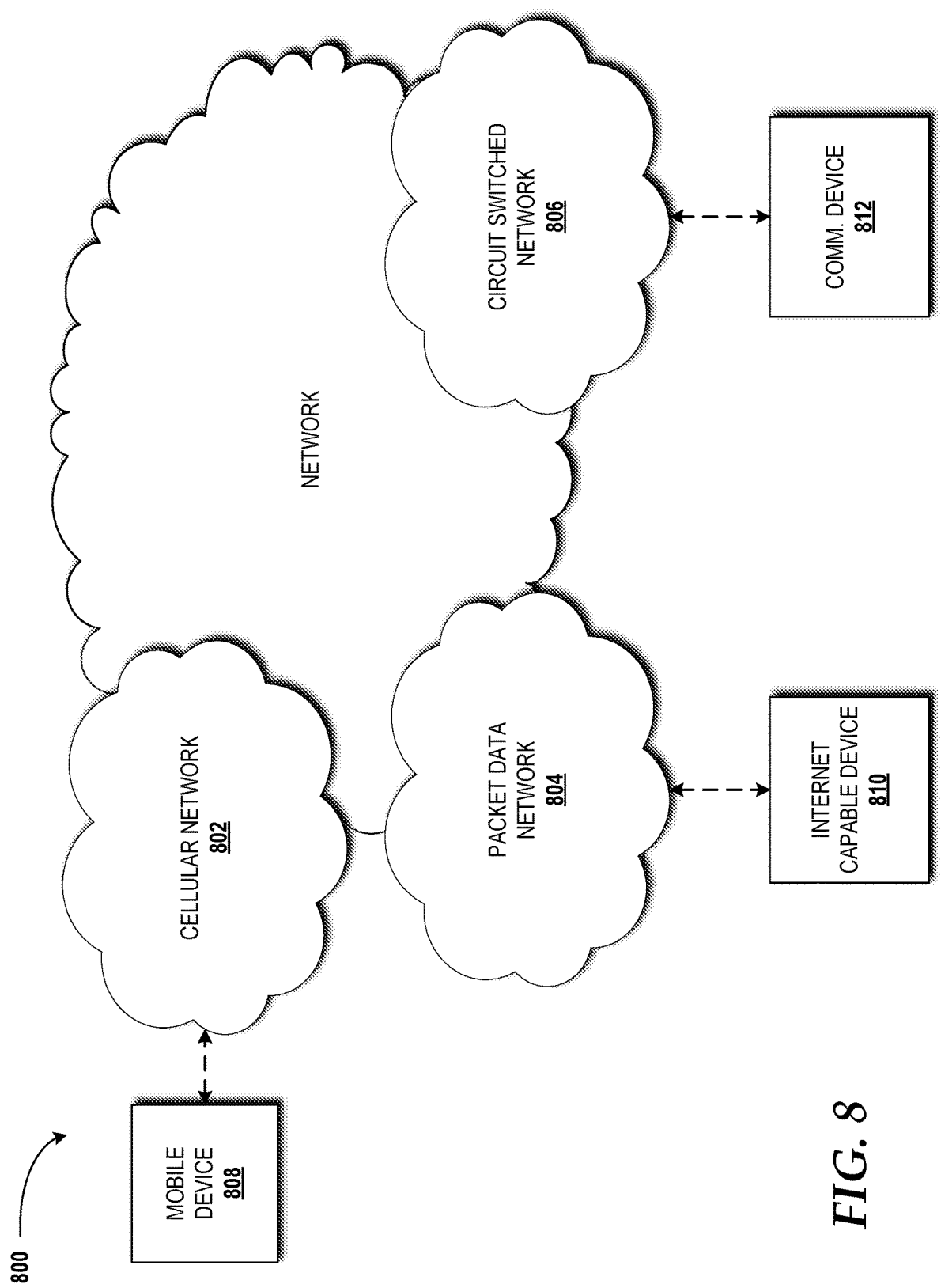
FIG. 8 is a block diagram illustrating an example network capable of implementing aspects of the embodiments presented herein.

Turning now to FIG. 8, details of a network 800 are illustrated, according to an illustrative embodiment. The network 800 includes a cellular network 802, a packet data network 804, and a circuit switched network 806, for example, a publicly switched telephone network ("PSTN").

The cellular network 802 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806. As explained above, the localized corroborator system 106 can include a cellular base station, such as, a BTS, NB, or eNB, for example.

A mobile communications device 808, such as, for example, the user device(s) 102, a computing device, a cellular telephone, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and the circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 800 is used to refer broadly to any combination of the networks 802, 804, 806. It should be appreciated that substantially all of the functionality described with reference to the network 800 can be performed by the cellular network 802, the packet data network 804, and/or the circuit switched network 806, alone or in combination with other networks, network elements, and the like.

Based on the foregoing, it should be appreciated that concepts and technologies directed to location-based blockchain have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A localized corroborator system comprising:
   a processor; and
   memory comprising instructions that, when executed by the processor, cause the processor to perform operations comprising
      receiving, from a user device, at a first time, an initiation message to initiate a location corroboration session between the user device and the localized corroborator system so that the localized corroborator system can corroborate that a geographical location of the user device is within a local geographical range of a known geographical location of the localized corroborator system, wherein the initiation message comprises a public key to be used during the location corroboration session, wherein the known geographical location comprises a sub-area of a set of sub-areas of a geographical area, and wherein the set of sub-areas represents a hierarchy,
      in response to receiving the initiation message, generating a random session identifier for the location corroboration session,
      sending the random session identifier to the user device,
      receiving, from the user device, at a second time, a signed session identifier comprising the random session identifier that has been signed by the user device using a user private key associated with the user device,
      determining an elapsed time between the first time and the second time,
      verifying, using the public key received in the initiation message, authenticity of the signed session identifier, and
      in response to the elapsed time being less than a pre-defined threshold, issuing a location certificate to the user device, wherein the location certificate is signed by the localized corroborator system using a corroborator private key associated with the localized corroborator system, wherein the location certificate corroborates that the geographical location of the user device is within the local geographical range of the known geographical location of the localized corroborator system, and wherein the user device utilizes the location certificate to conduct a certified blockchain transaction in a blockchain, wherein the blockchain comprises a plurality of sub-chains, wherein each sub-chain of the plurality of sub-chains is associated with one sub-area of the set of sub-areas of the geographical location, and wherein the certified blockchain transaction of the blockchain comprises a transfer of an asset from a first wallet associated with the user device to a second wallet associated with a second user device.

2. The localized corroborator system of claim 1, further comprising a cellular base station; and wherein the local geographical range is a communication range of the cellular base station.

3. The localized corroborator system of claim 1, wherein the transfer comprises:
   a lateral transfer within a particular sub-area of the set of sub-areas;
   an ascending transfer from a particular sub-area of the set of sub-areas to a parent sub-area of the particular sub-area of the set of sub-areas; or
   a descending transfer from a particular sub-area of the set of sub-areas to a child sub-area of the particular sub-area of the set of sub-areas.

4. The localized corroborator system of claim 1, wherein the certified blockchain transaction comprises a plurality of transfers of the asset.

5. A computer-readable storage medium comprising computer-executable instructions that, when executed by a processor of a localized corroborator system, cause the processor to perform operations comprising:
   receiving, from a user device, at a first time, an initiation message to initiate a location corroboration session between the user device and the localized corroborator system so that the localized corroborator system can corroborate that a geographical location of the user device is within a local geographical range of a known geographical location of the localized corroborator system, wherein the initiation message comprises a public key to be used during the location corroboration session, wherein the known geographical location comprises a sub-area of a set of sub-areas of a geographical area, and wherein the set of sub-areas represents a hierarchy;
   in response to receiving the initiation message, generating a random session identifier for the location corroboration session;
   sending the random session identifier to the user device;
   receiving, from the user device, at a second time, a signed session identifier comprising the random session identifier that has been signed by the user device using a user private key associated with the user device;
   determining an elapsed time between the first time and the second time;
   verifying, using the public key received in the initiation message, authenticity of the signed session identifier; and
   in response to the elapsed time being less than a pre-defined threshold, issuing a location certificate to the user device, wherein the location certificate is signed by the localized corroborator system using a corroborator private key associated with the localized corroborator system, wherein the location certificate corroborates that the geographical location of the user device is within the local geographical range of the known geographical location of the localized corroborator system, and wherein the user device utilizes the location certificate to conduct a certified blockchain transaction in a blockchain, wherein the blockchain comprises a plurality of sub-chains, wherein each sub-chain of the plurality of sub-chains is associated with one sub-area of the set of sub-areas of the geographical location, and wherein the certified blockchain transaction of the blockchain comprises a transfer of an asset from a first wallet associated with the user device to a second wallet associated with a second user device.

6. The computer-readable storage medium of claim 5, wherein the localized corroborator system comprises a cellular base station; and wherein the local geographical range is a communication range of the cellular base station.

7. The computer-readable storage medium of claim 5, wherein the transfer comprises:
   a lateral transfer within a particular sub-area of the set of sub-areas;
   an ascending transfer from a particular sub-area of the set of sub-areas to a parent sub-area of the particular sub-area of the set of sub-areas; or
   a descending transfer from a particular sub-area of the set of sub-areas to a child sub-area of the particular sub-area of the set of sub-areas.

8. The computer-readable storage medium of claim 5, wherein the certified blockchain transaction comprises a plurality of transfers of the asset.

9. A method comprising:
   receiving, by a localized corroborator system comprising a processor, from a user device, at a first time, an initiation message to initiate a location corroboration session between the user device and the localized corroborator system so that the localized corroborator system can corroborate that a geographical location of the user device is within a local geographical range of a known geographical location of the localized corroborator system, wherein the initiation message comprises a public key to be used during the location corroboration session, wherein the known geographical location comprises a sub-area of a set of sub-areas of a geographical area, and wherein the set of sub-areas represents a hierarchy;
   in response to receiving the initiation message, generating, by the localized corroborator system, a random session identifier for the location corroboration session;
   sending, by the localized corroborator system, the random session identifier to the user device;
   receiving, by the localized corroborator system, from the user device, at a second time, a signed session identifier comprising the random session identifier that has been signed by the user device using a user private key associated with the user device;
   determining, by the localized corroborator system, an elapsed time between the first time and the second time;
   verifying, by the localized corroborator system, using the public key received in the initiation message, authenticity of the signed session identifier; and
   in response to the elapsed time being less than a predefined threshold, issuing, by the localized corroborator system, a location certificate to the user device, wherein the location certificate is signed by the localized corroborator system using a corroborator private key associated with the localized corroborator system, wherein the location certificate corroborates that the geographical location of the user device is within the local geographical range of the known geographical location of the localized corroborator system, and wherein the user device utilizes the location certificate to conduct a certified blockchain transaction in a blockchain, wherein the blockchain comprises a plurality of sub-chains, wherein each sub-chain of the plurality of sub-chains is associated with one sub-area of the set of sub-areas of the geographical location, and wherein the certified blockchain transaction of the blockchain comprises a transfer of an asset from a first wallet associated with the user device to a second wallet associated with a second user device.

10. The method of claim 9, wherein the transfer comprises:
    a lateral transfer within a particular sub-area of the set of sub-areas;
    an ascending transfer from a particular sub-area of the set of sub-areas to a parent sub-area of the particular sub-area of the set of sub-areas; or
    a descending transfer from a particular sub-area of the set of sub-areas to a child sub-area of the particular sub-area of the set of sub-areas.

11. The method of claim 9, wherein the certified blockchain transaction comprises a plurality of transfers of the asset.

* * * * *